United States Patent Office 3,262,902
Patented July 26, 1966

3,262,902
ALKYLENE OXIDE ELASTOMERS WITH
AROMATIC HYDROCARBON EXTENDERS
Anderson E. Robinson, Wilmington, Del., assignor to
Hercules Incorporated, a corporation of Delaware
No Drawing. Filed Dec. 26, 1961, Ser. No. 162,253
10 Claims. (Cl. 260—33.6)

The present invention relates to oil extended polymeric epoxides. More particularly, the invention relates to a rubbery composition comprising a cross-linked rubbery copolymer of propylene oxide and higher alkylene oxides with ethylenically unsaturated epoxides and an extending oil.

It is well known in the art to add different types of materials to conventional types of rubber. Good physical properties in SBR (styrene-butadiene copolymer) vulcanizates, for example, are obtained only if reinforcing agents are included. In addition to reinforcing agents, there is a class of organic materials which, although they are without marked reinforcing action, are used to lower the raw material cost. These materials are called extender. More specifically, extenders are relatively inexpensive materials, principally hydrocarbon oils, used to replace rather large proportions of rubber with a disproportionately small change in physical properties of the vulcanized product. To serve their function of reducing raw material cost, they are normally used in an amount of at least about 10% by weight of the rubber, i.e., at least about 10 parts of oil per 100 parts of polymer.

Recent improvements in the art of polymerization have enabled the production of solid, high molecular weigt, water-insoluble copolymers of propylene oxide and higher alkylene oxides with ethylenically unsaturated epoxides that are cross-linkable, i.e., vulcanizable, by means of conventional sulfur cross-linking agents. These copolymers when suitably cross-linked have the physical characteristics of vulcanized rubber and offer promise as improved replacements for rubber, both natural and synthetic, in many applications.

Since these copolymers are reasonably expensive, it was apparent from the time of their discovery that it would be desirable to extend them in the same manner as other types of rubber are extended. However, it was found that the extending oils, predicted from their solubility parameters to be compatible, i.e., miscible, with the copolymers, were either marginally or wholly incompatible.

The present invention is based on the discovery that contrary to predictable compatibility, these copolymers can be extended most satisfactorily with an aromatic hydrocarbon extending oil, provided that (1) the molecular weight of the copolymer is sufficiently high and (2) the extending oil meets certain structural requirements. More specifically, the requirements of the invention are that the copolymer have a weight average molecular weight of at least about 200,000 and that the hydrocarbon extending oil be one in which at least about 30% of the carbon atoms are in aromatic ring structures.

Hydrocarbon oils used as extenders in the rubber industry have been divided roughly into three classes: paraffinic, naphthenic and aromatic, although there are no sharp dividing lines between the three classes. The paraffinic and naphthenic oils contain little aromatic ring structures and differ essentially in the proportion of paraffin side chain to naphthene ring. The aromatic oils, of course, contain a larger amount of aromatic ring structures, but also contain a significant proportion of paraffin side chain and naphthene ring.

One type of analysis in current use to describe the structures of extending oils is called "carbon distribution" or "carbon type analysis." This type of analysis is reported in terms of the percentage of the total number of carbon atoms in the molecule which are in a given type of structure. The analysis is described by S. S. Kurtz et al. in India Rubber World, vol. 126, pp. 495–499, July 1952.

As stated above, any hydrocarbon oil in which at least about 30% of the carbon atoms are in aromatic ring structures can be used in accordance with this invention. In addition, it is possible to use a number of nonhydrocarbon extending oils either alone or mixed with an aromatic hydrocarbon extending oil. In particular, those oily esters having a solubility parameter range of from about 8.0 to about 10.0 ("solubility parameter" is defined by P. A. Small, Journ. Appl. Chem., 3, p. 71, 1953), a boiling point of at least about 250° C. and a molecular weight of at least about 300 can be used. However, since these nonhydrocarbon oils are relatively more expensive than the aromatic hydrocarbon extending oils, they are at the present time only used in a few specialty applications were hydrocarbons are not desirable.

The amount of extending oil employed in the practice of the invention will vary approximately in direct proportion to the molecular weight of the copolymer used, the cross-link density of the vulcanizate and to some extent the amount and type of reinforcing filler in the vulcanizate, and is limited only to the point that vulcanizate properties become unsatisfactory. In general, an amount of from about 10% to as high as about 100%, preferably about 25% to about 75%, by weight, based on the weight of the copolymer, can be used.

There are various ways in which the extending oil can be incorporated in the copolymer which will be obvious to a person skilled in the art. For example, the oil and copolymer can be codissolved in a mutual solvent and the solvent removed or the oil simply can be poured over the copolymer and imbibed naturally.

The copolymers extended in accordance with this invention are those produced by the copolymerization of an alkylene oxide containing at least three carbon atoms with at least one other epoxide, at least one of which is unsaturated, said copolymer having a weight average molecular weight of at least about 200,000. Exemplary of the unsaturated epoxides that can be copolymerized with an alkylene oxide to produce such copolymers are the epoxides which have the general formula

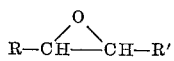

where R' is an ethylenically unsaturated radical as, for example, ethylenically unsaturated aliphatic radicals, aryl radicals containing an ethylenically unsaturated substituent, cycloalkyl radicals containing an ethylenically unsaturated substituent or an ethylene double bond in the ring or an ethylenically unsaturated ether radical having the general formula $$-(CR_2'')_n-OR'''$$

where R'' is hydrogen or alkyl, n is an integer of from 1-4 and R''' is an ethylenically unsaturated radical as defined above; and R is hydrogen, alkyl, or an ethylenically unsaturated ether radical as defined above; or R and R' together with the two carbon atoms of the epoxy group can form a cycloaliphatic ring, e.g.,

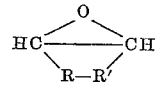

which can itself contain an ethylene double bond or which may be substituted by an ethylenically unsaturated hydrocarbon group. Typical of the unsaturated epoxides that can be copolymerized with an alkylene oxide are allyl glycidyl ether, methallyl glycidyl ether, vinylcyclohexyl glycidyl ether, o-allylphenyl glycidyl ether, the allyl ether of 2,3-epoxy-butan-1-ol, the allyl ether of 2,3-epoxy-hexan-1-ol, the diallyl ether of 2,3-epoxy-butan-1,4-diol, butadiene monoxide, chloroprene monoxide, 3,4-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinyl-cyclohexene, 1,2-epoxy-5,9-cyclododecadiene, divinylbenzene monoxide, 5,6-epoxy-1,7-octadiene, etc.

Any alkylene oxide containing at least three carbon atoms and most preferably those alkylene oxides in which the oxygen is connected to adjacent carbon atoms or mixtures thereof can be copolymerized with an ethylenically unsaturated epoxide to produce the copolymers which are extendable in accordance with the invention. Exemplary of the most preferred alkylene oxides are 1,2-propylene oxide, butene-1 oxide, cis and trans butene-2 oxides, hexene-1 oxide, hexene-2 oxide, dodecene-1 oxide, hexadecene-1 oxide, octadecene-1 oxide, etc. Mixtures of any of these alkylene oxides can be used so that the final polymer is a terpolymer, tetrapolymer (quaternary polymer), etc., or any other epoxide can be included to produce a terpolymer, tetrapolymer, etc. However, if ethylene oxide is included as a third monomer, the amount of ethylene oxide introduced into the polymer must be kept below about 10%, and preferably below about 5%, since above this amount the polymer becomes water-sensitive and/or water-soluble and, hence, is not useful for most rubber applications. In general, these copolymers contain from about 99% to about 50% of the alkylene oxide containing at least three carbon atoms and from about 1% to about 50% of the ethylenically unsaturated epoxide monomer. These copolymers are high molecular weight, substantially linear polyethers which are largely amorphous. However, some degree of crystallinity may be somewhat advantageous in some cases. The amount of crystallinity should not exceed that amount which interferes seriously with the rubbery properties of the copolymer. In general, it should be below about 25% and preferably below about 15%.

The copolymers useful in this invention can be prepared by contacting a mixture of the alkylene oxide and the ethylenically unsaturated epoxide with an organoaluminum compound, preferably one which has been reacted with from about 0.1 to 2 moles of a chelating agent such as acetylacetone, trifluoroacetylacetone, etc., and/or reacted with from about 0.1 to about 1.5 moles of water per mole of the organoaluminum compound. Exemplary of the organoaluminum compounds that can be so reacted with the chelating agent and/or water and used as the catalyst are triethylaluminum, tripropylaluminum, triisobutylaluminum, trioctylaluminum, diethylaluminum hydride, diisobutylaluminum hydride, etc.

The copolymerization reaction is generally carried out in the presence of an inert, liquid, organic diluent but can be carried out in an essentially bulk polymerization process. Suitable diluents that can be used for the copolymerization are the ethers, halogenated hydrocarbons, etc., or preferably a hydrocarbon diluent such as propane, butane, pentenes, n-heptane, cyclohexane, benzene, etc., and mixtures of such diluents. The temperature of the copolymerization process can be varied over a wide range, generally from about −80° C. to about 250° C., and while atmospheric pressure is usually used, the pressure can be varied from subatmospheric up to several atmospheres. By using the catalysts and the reaction conditions mentioned above, copolymerization takes place through the epoxy groups to yield a polyether product.

The extended copolymers of this invention can be cross-linked by means of a conventional sulfur cure. By "conventional sulfur cure" is meant a cross-linking process using elemental sulfur as the primary cross-linking agent, most preferably in conjunction with at least one accelerator. Exemplary of the accelerators are the dithiocarbamates such as zinc dimethyldithiocarbamate, tellurium diethyldithiocarbamate, piperidinium pentamethylene dithiocarbamate, etc.; the alkyl thiuram sulfides such as symmetrical dimethyl thiuram disulfide, tetramethyl thiuram monosulfide, tetramethyl thiuram disulfide, tetramethyl thiuram tetrasulfide, tetraethyl thiuram monosulfide, tetraethyl thiuram disulfide, etc., and the thiazoles, preferably the benzothiazoles, such as benzothiazole, 2-mercaptobenzothiazole, 2-methyl mercaptobenzothiazole, 2-ethyl benzothiazole, 2-benzothiazyl disulfide, etc.

The optimum ratio of sulfur to extended copolymer and the optimum ratio of sulfur to accelerator are readily determined for any composition of copolymer and oil extender. In general, from about 0.1% to about 10.0% by weight, based on the combined weight of copolymer and extending oil, of sulfur, and from about 0.1% to about 10.0% by weight, based on the combined weight of copolymer and extending oil, of accelerator, are employed in the practice of this invention.

Cross-linking (vulcanizing) according to this invention is achieved simply by heating. Generally, this will require a minimum temperature of about 130° C. with the maximum temperature being limited only by the decomposition of the copolymer. The manner in which the copolymer is heated can vary according to the objective in mind. For example, the copolymer can be molded by pressure or extrusion while at the same time applying heat to raise the temperature to that required for cross-linking. In other cases, it may be sufficient to merely heat the copolymer in an oven or equivalent apparatus.

The extended copolymer composition will normally contain one or more additional additives such as fillers, plasticizers, tackifiers, cross-linking aids, etc., as will be evident from the examples, but the presence or absence of such additives is immaterial to the invention.

The following examples are presented for purposes of illustration, parts and percentages being by weight unless otherwise specified.

*Example 1*

Samples of a copolymer of 1,2-propylene oxide and allyl glycidyl ether (containing 5 weight percent of allyl glycidyl ether and having a weight average molecular weight of 800,000) were codissolved in benzene with different hydrocarbon extending oils. From the resulting solutions films were cast on glass panels and air-dried. Oil-copolymer compatibility was judged from the appearance of the dry film, an optically clear film indicating compatibility and a cloudy and/or bleeding film (film exuding oil) indicating incompatibility. A comparison of the films is shown in Table I.

TABLE I

| Extending Oil | Film Characteristics | |
|---|---|---|
| | Optical | Bleeding |
| None | Clear | None. |
| Paraffinic hydrocarbon oil (55% of the carbon atoms paraffinic, 39% naphthenic and 6% aromatic, specific gravity of 0.87 at 15.5° C., viscosity at 100° F. of S.U.S.[1] 215). | Opaque | Very bad. |
| Naphthenic hydrocarbon oil (42% of the carbon atoms naphthenic, 42% paraffinic and 16% aromatic, specific gravity of 0.95 at 15.5° C., viscosity at 100° F. of S.U.S. 2,029). | ...do | Bad. |
| Aromatic hydrocarbon oil (34% of the carbon atoms aromatic, 45% paraffinic, and 21% naphthenic, specific gravity of 0.99 at 15.5° C., viscosity at 100° F. of S.U.S. 7,200). | Clear | None. |

[1] S.U.S.—Saybolt universal seconds.

*Examples 2–4*

Two samples of a copolymer of 1,2-propylene oxide and allyl glycidyl ether (containing 5 weight percent of allyl glycidyl ether and having a weight average molecular weight of 800,000) were extended with different amounts of the aromatic hydrocarbon extending oil described in Table I by codissolving the oil and copolymer in benzene and then drying. These two samples plus one nonextended sample of the same copolymer were cross-linked with sulfur and accelerators. The formulation of each sample was as follows:

Each formulation was compounded and cured as described in Examples 2-4. The properties of the resulting vulcanizates are shown in Table III.

TABLE III

| Example | Tensile Strength, p.s.i. | Modulus at 200% Elongation, p.s.i. | Modulus at 300% Elongation, p.s.i. | Elongation at break, percent | Shore Hardness A-2 |
|---|---|---|---|---|---|
| 5 | 1,265 | 890 | 1,230 | 330 | 66 |
| 6 | 1,255 | 880 | 1,085 | 335 | 65 |
| 7 | 1,980 | 650 | 1,055 | 645 | 60 |

| Formulation | Examples | | |
|---|---|---|---|
| | 2 | 3 | 4 |
| Copolymer, parts | 100 | 70 | 60 |
| Aromatic oil, parts | 0 | ¹30 | ¹40 |
| High abrasion furnace black, parts | 50 | 50 | 50 |
| Stearic acid, parts | 1 | 1 | 1 |
| Zinc oxide, parts | 5 | 5 | 5 |
| Sulfur, parts | 2 | 2 | 2 |
| Benzothiazyl disulfide, parts | 1 | 1 | 1 |
| Tetramethylthiuram disulfide, parts | 2 | 2 | 2 |

¹ Present in the copolymer before formulation.

Each formulation was compounded on a two-roll mill for approximately 15 minutes at a temperature of 93° C. and then cured for 45 minutes at a temperature of 155° C. under a pressure of 1500 p.s.i. The properties of the resulting vulcanizates are compared in Table II.

TABLE II

| Example | Tensile Strength, p.s.i. | Modulus at 200% Elongation, p.s.i. | Elongation at break, percent |
|---|---|---|---|
| 2 | 2,260 | 1,560 | 300 |
| 3 | 2,070 | 820 | 500 |
| 4 | 2,020 | 660 | 600 |

*Examples 5–7*

Three samples of different polyether copolymers were extended with the aromatic hydrocarbon extending oil described in Table I and then cross-linked with sulfur and accelerators. The extending oil was incorporated in each copolymer by pouring the desired amount of oil over the chopped copolymer and allowing the mixture to steep 20 hours at a temperature of 80° C. During this time the oil was completely imbided. The formulation of each sample was as follows:

| Formulation | Examples | | |
|---|---|---|---|
| | 5 | 6 | 7 |
| Copolymer of 1,2-propylene oxide and butadiene monoxide, (15 weight % of butadiene monoxide, weight average molecular weight 550,000), parts | 75 | | |
| Copolymer of cis butene-2 oxide and vinylcyclohexene monoxide (10 weight % of vinylcyclohexene monoxide, weight average molecular weight 450,000), parts | | 80 | |
| Copolymer of 1,2-propylene oxide and allylglycidyl ether (5 weight % of allylglycidyl ether, weight average molecular weight 800,000 parts | | | 65 |
| Aromatic oil, parts | ¹25 | ¹20 | ¹35 |
| High abrasion furnace black, parts | 50 | 50 | 50 |
| Stearic acid, parts | 1 | 1 | 1 |
| Zinc oxide, parts | 5 | 5 | 5 |
| Sulfur, parts | 2 | 2 | 2 |
| Benzothiazyl disulfide, parts | 1 | 1 | 1 |
| Tellurium diethyldithiocarbamate, parts | | | 2 |
| Tetramethylthiuram disulfide, parts | 2 | 2 | |

¹ Present in the copolymer before formulation.

What I claim and desire to protect by Letters Patent is:

1. A vulcanizable oil extended copolymer composition comprising:
   (a) a water-insoluble copolymer of from about 50% to about 99% of an alkylene oxide containing 3 to 4 carbon atoms and from about 1% to about 50% of at least one other epoxide selected from the group consisting of ethylenically unsaturated glycidyl ethers, butadiene monoxide and vinylcyclohexene monoxide, said copolymer having a weight average molecular weight of at least about 200,000,
   (b) from about 10% to about 100% by weight based on the weight of the copolymer of an aromatic hydrocarbon oil in which at least about 30% of the carbon atoms are in aromatic ring structures and which has a solubility parameter range of from about 8.0 to about 10.0 and
   (c) a small amount of cross-linking agent comprising elemental sulfur and at least one accelerator selected from the group consisting of dithiocarbamates, alkyl thiuram sulfides and benzothiazoles.

2. The composition of claim 1 wherein the copolymer is a copolymer of propylene oxide and allyl glycidyl ether.

3. The composition of claim 1 wherein the copolymer is a copolymer of cis butene-2 oxide and vinylcyclohexene monoxide.

4. The composition of claim 1 wherein the copolymer is a copolymer of propylene oxide and butadiene monoxide.

5. The composition of claim 1 wherein the cross-linking agent contains elemental sulfur and a mixture of a benzothiazole and an alkyl thiuram sulfide.

6. The composition of claim 1 wherein the cross-linking agent contains elemental sulfur and a mixture of a benzothiazole and a dithiocarbamate.

7. A rubbery composition comprising cross-linked copolymer of from about 50% to about 99% of an alkylene oxide containing 3 to 4 carbon atoms and from about 1% to about 50% of at least one other epoxide selected from the group consisting of ethylenically unsaturated glycidyl ethers, butadiene monoxide and vinylcyclohexene monoxide, said copolymer having a weight average molecular weight of at least about 200,000 and containing from about 10% to about 100% by weight based on the weight of the copolymers of an aromatic hydrocarbon oil in which at least about 30% of the carbon atoms are in aromatic ring structure and which has a solubility parameter range of from about 8.0 to about 10.0.

8. The composition of claim 7 wherein the copolymer is a copolymer of propylene oxide and allyl glycidyl ether.

9. The composition of claim 7 wherein the copolymer is a copolymer of propylene oxide and butadiene monoxide.

10. The composition of claim 7 wherein the copolymer is a copolymer of cis butene-2 oxide and vinylcyclohexene monoxide.

(References on following page)

References Cited by the Examiner

UNITED STATES PATENTS

| | | | |
|---|---|---|---|
| 2,706,189 | 4/1955 | Pruitt et al. | 260—33.6 |
| 2,906,720 | 9/1959 | Simpson | 260—33.6 |
| 2,921,921 | 1/1960 | Greenspan et al. | 260—33.6 |
| 3,029,216 | 4/1962 | Bailey et al. | 260—2 |
| 3,031,439 | 4/1962 | Bailey | 260—2 |
| 3,062,755 | 11/1962 | Hill et al. | 260—2 |
| 3,062,771 | 11/1962 | Boenau et al. | 260—33.6 |
| 3,065,187 | 11/1962 | Vandenberg | 260—2 |
| 3,158,581 | 11/1964 | Vandenberg | 260—37 |

OTHER REFERENCES

Industrial and Engineering Chemistry, vol. 45, No. 5, pages 1037–38; May, 1953.

MORRIS LIEBMAN, *Primary Examiner.*

D. W. ERICKSON, J. E. CALLAGHAN,
*Assistant Examiners.*